(12) United States Patent
Tate (10) Patent No.: US 11,902,454 B2
(45) Date of Patent: Feb. 13, 2024

(54) INFORMATION PROCESSING METHOD, INFORMATION PROCESSING PROGRAM, INFORMATION PROCESSING APPARATUS, AND INFORMATION PROCESSING SYSTEM

(71) Applicant: CONNECTFREE CORPORATION, Kyoto (JP)

(72) Inventor: Kristopher Andrew Tate, Kyoto (JP)

(73) Assignee: CONNECTFREE CORPORATION, Kyoto (JP)

( * ) Notice: Subject to any disclaimer, the term of this patent is extended or adjusted under 35 U.S.C. 154(b) by 138 days.

(21) Appl. No.: 17/273,611

(22) PCT Filed: Feb. 15, 2019

(86) PCT No.: PCT/JP2019/005681
§ 371 (c)(1),
(2) Date: Mar. 4, 2021

(87) PCT Pub. No.: WO2020/049754
PCT Pub. Date: Mar. 12, 2020

(65) Prior Publication Data
US 2021/0392001 A1 Dec. 16, 2021

(30) Foreign Application Priority Data
Sep. 5, 2018 (JP) ................. 2018-166429

(51) Int. Cl.
*H04L 9/32* (2006.01)
*H04L 9/06* (2006.01)
*H04L 9/08* (2006.01)

(52) U.S. Cl.
CPC .......... *H04L 9/3268* (2013.01); *H04L 9/0643* (2013.01); *H04L 9/3236* (2013.01); *H04L 9/0861* (2013.01)

(58) Field of Classification Search
CPC ... H04L 9/3268; H04L 9/0643; H04L 9/3236; H04L 9/0861; H04L 63/0823;
(Continued)

(56) References Cited

U.S. PATENT DOCUMENTS 6,802,002 B1 10/2004 Corella
10,581,841 B2 * 3/2020 Watanabe ............. H04L 9/3239
(Continued)

FOREIGN PATENT DOCUMENTS

JP 2001-237827 A 8/2001
JP 2003-501878 A 1/2003
(Continued)

OTHER PUBLICATIONS

Moore et al., 2015 IEEE, Milcom 2015 Track 3—Cyber Security and Trusted Computing, "Utilizing the BitTorrent DHT for Blind Rendezvous and Information Exchange", pp. 1560-1565 (Year: 2015).*

(Continued)

*Primary Examiner* — Khalil Naghdali
(74) *Attorney, Agent, or Firm* — Sughrue Mion, PLLC (57) ABSTRACT

An information processing method is executed by a processor of an apparatus, and includes a step of generating a public key of the apparatus based on a private key of the apparatus (S2), a step of generating a hash value based on the public key and a predetermined hash function (S3), and a step of determining an IP address of the apparatus based on the hash value (S6).

18 Claims, 8 Drawing Sheets

(58) Field of Classification Search
CPC ............ H04L 2209/805; H04L 9/3263; H04L 2101/604; H04L 2101/622; H04L 61/5007; H04L 63/205; H04W 8/26
See application file for complete search history.

(56) References Cited

U.S. PATENT DOCUMENTS

| | | |
|---|---|---|
| 2002/0152380 A1 | 10/2002 | O'Shea et al. |
| 2005/0015600 A1 | 1/2005 | Miyazaki et al. |
| 2006/0005014 A1 | 1/2006 | Aura et al. |
| 2007/0061574 A1 | 3/2007 | Shelest et al. |
| 2008/0301439 A1* | 12/2008 | Hashimoto ............ H04L 63/06 713/156 |
| 2014/0149740 A1* | 5/2014 | Sato ..................... H04L 9/006 713/158 |
| 2014/0241354 A1 | 8/2014 | Shuman et al. |
| 2016/0301531 A1* | 10/2016 | Finlow-Bates ......... G06F 21/64 |
| 2016/0373418 A1* | 12/2016 | Ståhl ..................... G06F 21/44 |
| 2017/0272250 A1 | 9/2017 | Kaliski, Jr. |
| 2019/0020648 A1* | 1/2019 | Haque .................... G06F 16/27 |
| 2019/0373077 A1* | 12/2019 | Lepore ................... H04L 63/12 |

FOREIGN PATENT DOCUMENTS

| | | |
|---|---|---|
| JP | 2003-216571 A | 7/2003 |
| JP | 2005-51734 A | 2/2005 |
| JP | 2006-254403 A | 9/2006 |
| JP | 2016-515328 A | 5/2016 |
| WO | 00/74301 A1 | 12/2000 |

OTHER PUBLICATIONS

Jegatheesan et al., 2018 International Conference on Emerging Trends and Innovations in Engineering and Technological Research (ICETIETR), "Secure and Efficient Key Sharing Scheme for MANET Using a Symmetric Approach", pp. 1-7 (Year: 2018).*
Communication dated Apr. 13, 2022 by the European Patent Office in European Patent Application No. 19857922.9.
International Search Report dated Apr. 23, 2019 issued by the International Searching Authority in counterpart International Application No. PCT/JP2019/005681 (PCT/ISA/210).
International Written Opinion dated Apr. 23, 2019 issued by the International Searching Authority in counterpart International Application No. PCT/JP2019/005681 (PCT/ISA/237.
"Report on Investigation of Current State of Identity Verification Technology", Information-Technology Promotion Agency, Mar. 2003, pp. 13-18, 7 pages total.
Office Action dated Oct. 25, 2022 issued by the Taiwanese Patent Office in counterpart Taiwanese Application No. 108132097.
Notification of Reasons for Refusal dated Mar. 22, 2023 from the Japanese Patent Office in application No. 2021-189977.
Kunihiko Miyazaki et al., "Digital Document Sanitizing Problem", IPSJ SIG Technical Report, Jul. 10, 2003, vol. 103, No. 195, pp. 61-67 (7 total pages).

* cited by examiner

INFORMATION PROCESSING METHOD, INFORMATION PROCESSING PROGRAM, INFORMATION PROCESSING APPARATUS, AND INFORMATION PROCESSING SYSTEM

This application is a National Phase Entry of PCT International Application No. PCT/JP2019/005681 filed on Feb. 15, 2019, which claims priority to Japanese Patent Application No. 2018-166429 filed on Sep. 5, 2018, the entire contents of which are incorporated by reference herein.

TECHNICAL FIELD

The present disclosure relates to an information processing method, an information processing program, an information processing apparatus, and an information processing system.

BACKGROUND ART

The development of information and communication technology in recent years has been remarkable, and not only personal computers, smartphones, and tablets, but also all things such as automobiles, home appliances, and sensor devices are being connected to communication networks, such as the Internet. Thus, it is expected that an IoT (Internet of Things) society in which trillions of apparatuses on the earth are connected to communication networks will arrive in the near future (see Patent Literature 1).

CITATION LIST

Patent Literature

Patent Literature 1: JP 2016-515328 A

SUMMARY OF INVENTION

Technical Problem

Incidentally, as disclosed in Patent Literature 1, in the current IoT technology, an Internet service provider (ISP) manages the IP address of each device connected to the Internet. For example, when a predetermined apparatus is connected to the Internet, the ISP assigns an IP address to the predetermined apparatus. Thereafter, the predetermined apparatus can access a WEB server on the Internet using the IP address assigned by the ISP. Thus, when connecting an apparatus to a communication network such as the Internet, the intervention of a provider who manages an IP address such as an ISP is required, and there is room for improvement in terms of improving the user experience or user convenience for connection to the communication network.

It is an object of the present disclosure to provide an information processing method, an information processing program, an information processing apparatus, and an information processing system capable of improving the user experience or user convenience for connection to the communication network.

Solution to Problem

An information processing method according to an aspect of the present disclosure is executed by a processor of an apparatus, and includes: a step of generating a public key of the apparatus based on a private key of the apparatus; a step of generating a hash value based on the public key and a predetermined hash function; and a step of determining a network address of the apparatus based on the hash value.

In addition, the information processing method may further include a step of generating the private key.

In addition, the information processing method may further include a step of transmitting the public key to an external apparatus present outside the apparatus.

In addition, the information processing method may further include a step of determining whether or not the hash value satisfies a predetermined condition. When the hash value satisfies the predetermined condition, the network address may be determined based on the hash value.

In addition, the information processing method may further include a step of generating the private key.

When the hash value does not satisfy the predetermined condition, the step of generating the private key, the step of generating the public key, and the step of generating the hash value may be repeatedly executed until the hash value satisfies the predetermined condition.

In addition, the predetermined condition may include a condition associated with values of first two digits of the hash value.

In addition, the predetermined condition may include a condition associated with a type of the apparatus.

In addition, the step of generating the hash value may include a step of generating the hash value based on the public key, a value associated with a predetermined organization, and the predetermined hash function.

In addition, the value associated with the predetermined organization may be a value associated with a trademark of the predetermined organization.

In addition, the information processing method may further include a step of acquiring a digital certificate associated with the public key from a certificate authority.

In addition, the information processing method may further include a step of transmitting the public key and the digital certificate to an external apparatus present outside the apparatus.

In addition, the digital certificate may include information regarding attributes of the apparatus.

In addition, the digital certificate may include attribute information of a user associated with the apparatus.

In addition, the digital certificate may include attribute information of the apparatus and/or a user associated with the apparatus and a hash value of all the attribute information.

In addition, a part of the attribute information may be hashed.

In addition, a part of the attribute information may be hashed based on a part of the attribute information and a predetermined coefficient.

In addition, the information processing method may further include: a step of receiving a public key of an external apparatus present outside the apparatus from the external apparatus; a step of generating a hash value of the external apparatus based on the public key of the external apparatus and the predetermined hash function; and a step of determining a network address of the external apparatus based on the hash value of the external apparatus.

In addition, the step of receiving the public key of the external apparatus may include a step of receiving a public key of the external apparatus and a digital certificate associated with the public key. The information processing method may further include a step of determining whether or not the digital certificate is valid. When it is determined that the digital certificate is valid, the hash value of the external apparatus may be generated based on the public key of the external apparatus.

An information processing method according to an aspect of the present disclosure is executed by a processor of an apparatus, and includes a step of determining a network address of the apparatus based on a public key of the apparatus.

In addition, the information processing method may further include a step of performing communication using the network address of the apparatus without going through a server that manages a network address.

In addition, the information processing method may be executed in a network layer of an OSI reference model.

In addition, an information processing program for causing a computer to execute the information processing method described above is provided. In addition, a computer-readable storage medium in which the information processing program is stored is provided.

An information processing apparatus according to an aspect of the present disclosure includes at least one processor and a memory that stores computer-readable instructions. When the computer-readable instructions are executed by the processor, the information processing apparatus is configured to execute the information processing method described above.

An information processing system according to an aspect of the present disclosure includes a first apparatus and a second apparatus communicably connected to the first apparatus.

The first apparatus generates a first public key of the first apparatus based on a first private key of the first apparatus, generates a first hash value based on the first public key and a predetermined hash function, determines a first network address of the first apparatus based on the first hash value, and transmits the first public key to the second apparatus.

The second apparatus generates a second public key of the second apparatus based on a second private key of the second apparatus, generates a second hash value based on the second public key and the predetermined hash function, determines a second network address of the second apparatus based on the second hash value, and transmits the second public key to the first apparatus.

The first apparatus receives the second public key from the second apparatus, generates the second hash value based on the second public key and the predetermined hash function, and determines the second network address based on the second hash value.

The second apparatus receives the first public key from the first apparatus, generates the first hash value based on the first public key and the predetermined hash function, and determines the first network address based on the first hash value.

In addition, the first apparatus may transmit the first public key to a certificate authority, acquire a first digital certificate associated with the first public key from the certificate authority, and transmit the first digital certificate and the first public key to the second apparatus.

The second apparatus may transmit the second public key to the certificate authority or another certificate authority, acquire a second digital certificate associated with the second public key from the certificate authority or the another certificate authority, and transmit the second digital certificate and the second public key to the first apparatus.

The first apparatus may receive the second public key and the second digital certificate from the second apparatus, and determine whether or not the second digital certificate is valid.

The second apparatus may receive the first public key and the first digital certificate from the first apparatus, and determine whether or not the first digital certificate is valid.

Effects of Invention

According to the present disclosure, it is possible to provide the information processing method, the information processing program, the information processing apparatus, and the information processing system capable of improving the user experience or user convenience for connection to the communication network.

DESCRIPTION OF EMBODIMENTS

Hereinafter, the present embodiment will be described with reference to the drawings. First, the hardware configuration of an information processing apparatus 2 according to an embodiment (hereinafter, simply referred to as "the present embodiment") of the invention will be described below with reference to FIG. 1.

Figure 1:
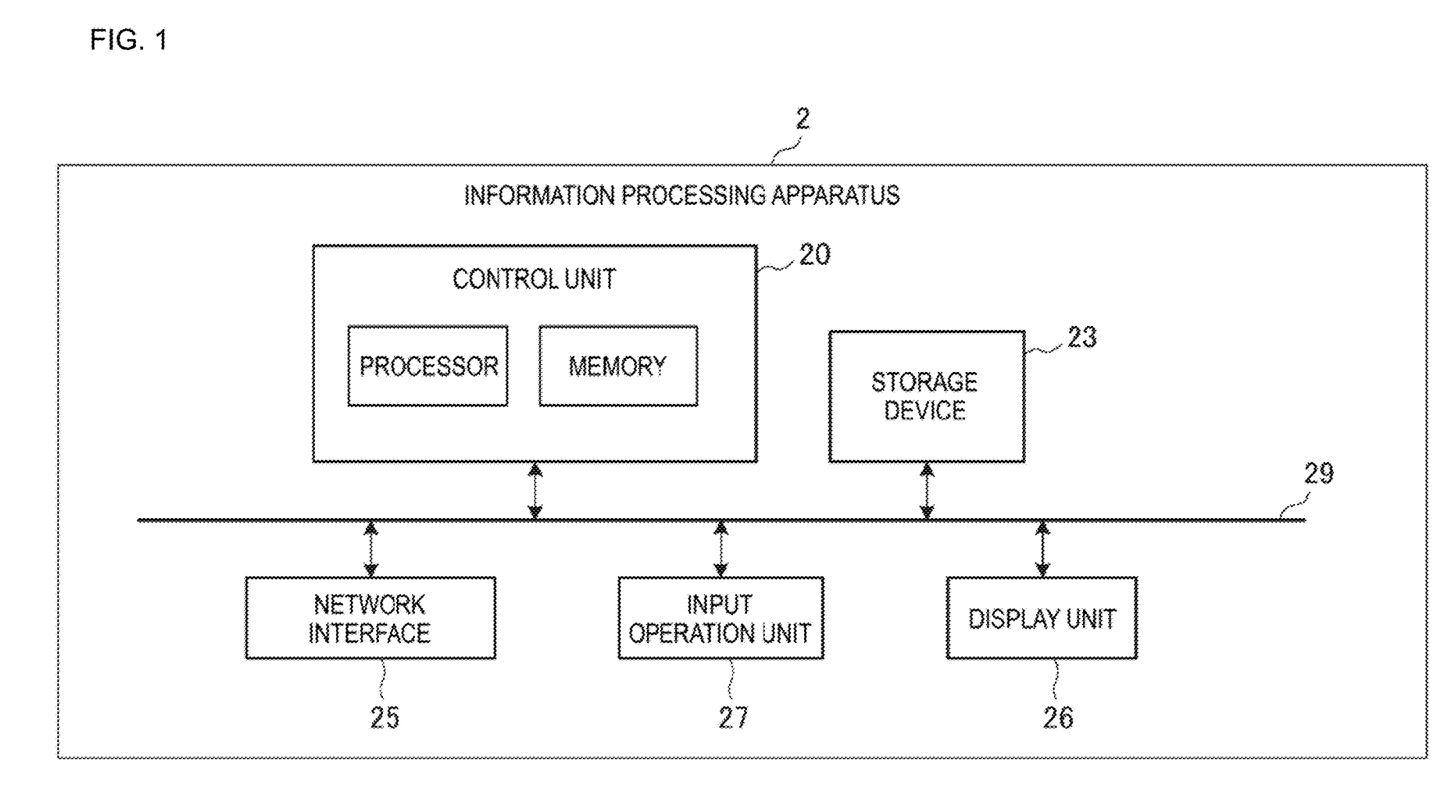
FIG. 1 is a diagram illustrating an example of the hardware configuration of an information processing apparatus according to an embodiment of the invention (hereinafter, referred to as the present embodiment).

FIG. 1 is a diagram illustrating an example of the hardware configuration of the information processing apparatus 2 according to the present embodiment. As illustrated in FIG. 1, the information processing apparatus 2 (hereinafter, simply referred to as "apparatus 2") includes a control unit 20, a storage device 23, a network interface 25, a display unit 26, and an input operation unit 27. These are communicably connected to each other through a bus 29.

The apparatus 2 may be, for example, a personal computer, a smartphone, a tablet, or a wearable device (for example, a smart watch or an AR glass) worn on the user's body (for example, an arm or a head). In addition, the apparatus 2 may be a control device installed in a smart home appliance, a connected automobile, a factory, and the like. As described above, as the type of apparatus 2, all objects that are connected to a communication network, such as the Internet, using an IP address (an example of a network address) and include a processor and a memory are included. In the present embodiment, the apparatus 2 includes the display unit 26 and the input operation unit 27, but these are not essential components of the apparatus 2.

The control unit 20 is configured to control the operation of the apparatus 2, and includes a memory and a processor. The memory is configured to store computer-readable instructions (for example, an information processing program). For example, the memory may be configured by a ROM (Read Only Memory) in which various programs and the like are stored, a RAM (Random Access Memory) having a plurality of work areas in which various programs and the like executed by the processor are stored, or the like. In addition, the memory may be configured by a flash memory or the like. The processor includes, for example, at least one of a CPU, an MPU (Micro Processing Unit), and a GPU (Graphics Processing Unit). The CPU may be configured by a plurality of CPU cores. The GPU may be configured by a plurality of GPU cores. The processor may be configured to load a program, which is designated from various programs read into the storage device 23 or the ROM, to the RAM and execute various processes in cooperation with the RAM. In particular, the apparatus 2 is configured to execute an information processing method according to the present embodiment when the processor executes an information processing program stored in the memory.

The storage device 23 is, for example, a storage device (storage) such as an HDD (Hard Disk Drive), an SSD (Solid State Drive), or a flash memory, and is configured to store programs or various kinds of data. An information processing program according to the present embodiment transmitted from the server on the Internet may be stored in the storage device 23.

The network interface 25 is configured to connect the apparatus 2 to a communication network. Specifically, the network interface 25 may include various wired connection terminals for communicating with an external apparatus, such as a server, through a communication network. In addition, the network interface 25 may include various processing circuits and antennas for communicating with a wireless router or a wireless base station. Wireless communication standards are, for example, Wi-Fi (registered trademark), Bluetooth (registered trademark), ZigBee (registered trademark), LPWA, or fifth generation mobile communication system (5G). In addition, the communication network also includes at least one of a local area network (LAN), a wide area network (WAN), a radio access network (RAN), and the Internet.

The display unit 26 may be a display device, such as a liquid crystal display or an organic EL display, or may be a transmissive type or non-transmissive type head-mounted display worn on the operator's head. In addition, the display unit 26 may be a projector apparatus that projects an image onto the screen.

The input operation unit 27 is configured to receive an input operation of a user who operates the apparatus 2 and to generate an instruction signal corresponding to the input operation. The input operation unit 27 is, for example, a touch panel disposed on the display unit 26, an operation button attached to the housing, a mouse and/or a keyboard, and the like. After the instruction signal generated by the input operation unit 27 is transmitted to the control unit 20 through the bus 29, the control unit 20 executes a predetermined operation in response to the instruction signal. The display unit 26 and the input operation unit 27 may be connected to the apparatus 2 through an input and output interface, such as a USB.

Figure 2:
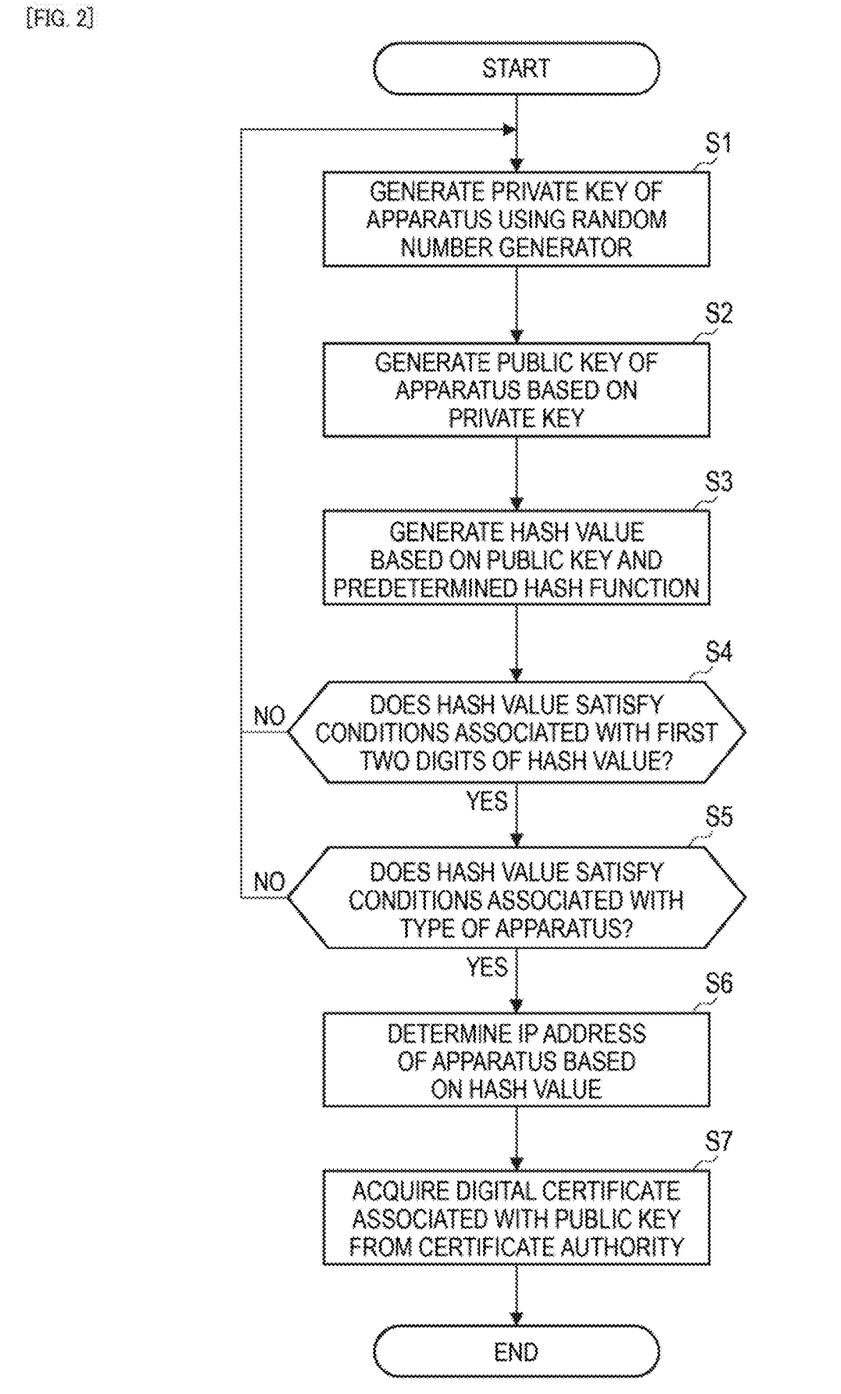
FIG. 2 is a flowchart for describing an example of a process of determining an IP address of an information processing apparatus.

Next, the information processing method according to the present embodiment will be described below with reference to FIG. 2. FIG. 2 is a flowchart for describing an example of a process of determining an IP address (for example, a global IP address) of the apparatus 2. As illustrated in FIG. 2, in step S1, the control unit 20 of the apparatus 2 generates a private key of the apparatus 2 using a random number generator. Here, the random number generator may be realized by the OS program of the apparatus 2, or may be realized as a hardware configuration (a logic circuit or the like) of the apparatus 2. In addition, the size of the generated private key is, for example, 512 bits.

Then, in step S2, the control unit 20 generates a public key of the apparatus 2 based on the generated private key and a predetermined cryptographic algorithm. Here, the predetermined cryptographic algorithm is, for example, an elliptic curve cryptographic algorithm. The size of the generated public key is, for example, 256 bits.

Then, in step S3, the control unit 20 generates a hash value based on the generated public key and a predetermined hash function. Here, the predetermined hash function is a cryptographic hash function, and for example, BLAKE is used. The size of the generated hash value is, for example, 256 bits.

In addition, the control unit 20 may generate a hash value based on the generated public key, a value associated with a predetermined organization, and a predetermined hash function in step S3. Here, as an example of the value associated with a predetermined organization, there is a value associated with the trademark of the predetermined organization. For example, when a predetermined organization uses the trademark X (for example, "connectFree"), the value of the trademark X may be used in generating the hash value. In this case, it is possible to prevent a third party other than the predetermined organization from creating an information processing program for executing the information processing method according to the present embodiment without the permission of the predetermined organization.

Then, the control unit 20 determines whether or not the generated hash value satisfies the conditions associated with the first two digits (first and second digits from the beginning) of the hash value displayed in hexadecimal (step S4). In this regard, when the size of the hash value is 256 bits, the hash value is displayed in 64 hexadecimal digits. For example, when the first two digits of the hash value displayed in 64 digits are "FC" (that is, hash value=FC . . . ), the control unit 20 may determine that the hash value satisfies the determination condition of step S4. If the determination condition of step S4 is YES, the process proceeds to step S5. On the other hand, if the determination condition of step S4 is NO, the process proceeds to step S1. That is, the processes of steps S1 to S3 are repeatedly executed until the determination condition of step S4 is satisfied.

Then, in step S5, the control unit 20 determines whether or not the hash value satisfies the conditions associated with the type of the apparatus 2 (step S5). In this regard, it is assumed that the type of the apparatus 2 associated with the IP address can be specified according to the values of the third and fourth digits from the beginning of the IP address displayed in hexadecimal. For example, it is assumed that the values of the third and fourth digits from the beginning of the IP address and the type of apparatus have the following relationship.

TABLE 1

| Third and fourth digits from the beginning of IP address displayed in hexadecimal | Type of apparatus |
| --- | --- |
| 00 | Personal computer (PC) |
| 01 | Smartphone, tablet, and wearable device |
| 02 | Information appliances |
| 03 | Vehicle |
| 04 | Instrument |

Here, when the values of the third and fourth digits of the hash value displayed in hexadecimal match the values of the third and fourth digits from the beginning of the IP address corresponding to the type of the apparatus 2, the determination condition of step S5 is satisfied. For example, it is assumed that the type of the apparatus 2 is a personal computer. In this case, since the values of the third and fourth digits from the beginning of the IP address of the apparatus 2 are "00", if the values of the third and fourth digits from the beginning of the hash value displayed in hexadecimal are "00" (that is, hash value=FC00 . . . ), the determination condition of step S5 is satisfied. On the other hand, if the values of the third and fourth digits from the beginning of the hash value are "11" (that is, hash value=FC11 . . . ), the determination condition of step S5 is not satisfied. If the determination condition of step S5 is YES, the process proceeds to step S6. On the other hand, if the determination condition of step S5 is NO, the process proceeds to step S1. That is, the processes of steps S1 to S3 are repeatedly executed until the determination condition of step S5 is satisfied. In addition, step S5 may be omitted.

Then, the control unit 20 determines the IP address of the apparatus 2 based on the hash value that satisfies the determination condition of steps S4 and S5 (step S6). For example, when the size of the hash value is 256 bits and the IP address (128 bits) corresponding to IPv6 is used as the IP address of the apparatus 2, the control unit 20 may determine the hash value of the first 32 digits of the 64-digit hash value as the IP address of the apparatus 2. In addition, when the size of the hash value is 128 bits and the IP address (128 bits) corresponding to IPv6 is used as the IP address of the apparatus 2, the control unit 20 may determine all the values of the 32-digit hash value as the IP address of the apparatus 2. In addition, when the size of the hash value is 256 bits and the IP address (32 bits) corresponding to IPv4 is used as the IP address of the apparatus 2, the control unit 20 may determine the hash value of the first 8 digits of the 64-digit hash value as the IP address of the apparatus 2.

After the process of step S6, a step of determining whether or not the determined IP address of the apparatus 2 overlap the IP address of another apparatus may be provided. Specifically, after the process of step S6, the apparatus 2 transmits information regarding the IP address of the apparatus 2 to the management server that manages the IP address through the communication network. The management server determines whether or not the IP address transmitted from the apparatus 2 overlaps one of the IP addresses included in the IP address management table stored in its storage device. Here, when the IP address of the apparatus 2 overlaps one of the IP addresses included in the IP address management table, the management server may transmit to the apparatus 2 a message indicating that the registration of the IP address is rejected. In this case, the apparatus 2 transmits, to the management server, information regarding the IP address determined again after executing the processes of steps S1 to S6 again. On the other hand, when the IP address of the apparatus 2 does not overlap any of the IP addresses included in the IP address management table, the management server may transmit to the apparatus 2 a message indicating that the registration of the IP address is allowed.

Then, in step S7, the control unit 20 acquires a digital certificate associated with the generated public key from the certificate authority of a predetermined organization. That is, the user of the apparatus 2 registers the public key in the certificate authority and acquires a digital certificate associated with the registered public key from the certificate authority. More specifically, the control unit 20 transmits a public key and a digital certificate issuance request (certificate signing request) to the server of the certificate authority through the communication network. Then, in response to the received digital certificate issuance request, the server of the certificate authority registers the public key and issues the digital certificate associated with the public key. Thereafter, the server of the certificate authority transmits the digital certificate to the apparatus 2 through the communication network.

In addition, the certificate authority of a predetermined organization may be an intermediate certificate authority of a predetermined organization. In addition, when acquiring a digital certificate associated with the public key from the certificate authority, it may be necessary to pay a predetermined fee.

Figure 3:
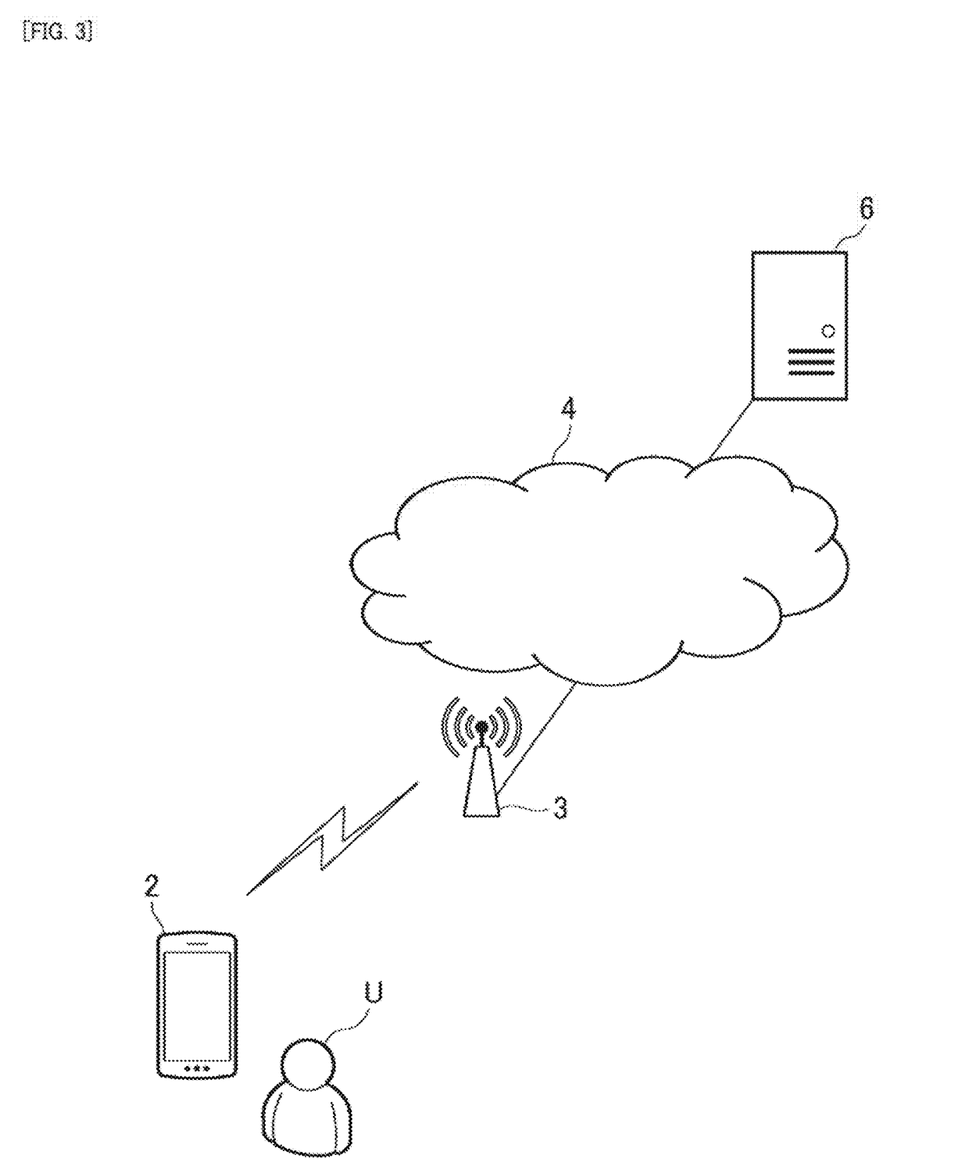
FIG. 3 is a diagram illustrating an information processing apparatus and a server on the Internet.

According to the present embodiment, an IP address unique to the apparatus 2 is determined based on the public key of the apparatus 2. Thus, the apparatus 2 can be connected to a communication network, such as the Internet, by using the IP address determined by the apparatus 2 itself. In particular, the apparatus 2 can be connected to the Internet using the IP address determined by the apparatus 2 itself without going through a service provider (server) that manages a global IP address such as an ISP. In this regard, as illustrated in FIG. 3, a user U who operates the apparatus 2 can access a WEB server 6 on the Internet 4 by predetermined routing through a wireless LAN router 3 by using the IP address determined by the apparatus 2 itself. In addition, the apparatus 2 can directly communicate with an external apparatus by using the IP address determined by the apparatus 2 itself without going through a server (for example, a DHCP server) that manages a private IP address (details will be described later).

Therefore, it is possible to provide the information processing method and the apparatus 2 capable of improving the user experience or user convenience for connection to the communication network such as the Internet.

In addition, according to the present embodiment, a hash value satisfying the conditions of steps S4 and S5 can be generated. That is, it is possible to generate an IP address associated with a hash value satisfying the conditions of steps S4 and S5.

Specifically, the values of the first two digits of the hash value displayed in hexadecimal can be set to fixed values (for example, hash value=FC . . . ). That is, the values of the first two digits of the IP address can be set to fixed values (for example, IP address=FC . . . ). Therefore, a third party can determine whether or not the IP address of the apparatus 2 is the IP address determined by the apparatus 2 itself.

In addition, in the present embodiment, a hash value corresponding to the type of the apparatus 2 can be generated. That is, it is possible to generate an IP address according to the type of the apparatus 2. Therefore, a third party can specify the type of the apparatus 2 based on the IP address of the apparatus 2.

In addition, in the present embodiment, since the hash value is repeatedly generated until the determination conditions of steps S4 and S5 are satisfied, it is possible to reliably generate the IP address associated with the hash value satisfying the conditions of steps S4 and S5.

In addition, according to the present embodiment, the public key is directly authenticated by the certificate authority through the acquisition of the digital certificate, and the IP address determined based on the public key is also indirectly authenticated by the certificate authority. Thus, the apparatus 2 can be connected to a communication network, such as the Internet, using an IP address indirectly authenticated by the certificate authority.

In addition, in the description of the present embodiment, the private key of the apparatus 2 is generated by using the random number generator of the apparatus 2. However, the private key of the apparatus 2 may be provided by an external apparatus communicably connected to the apparatus 2. In addition, the order of the steps illustrated in FIG. 2 is not particularly limited. For example, the process of step S6 may be executed after the process of step S7.

In addition, the digital certificate associated with the public key may include information (attribute information) regarding the attributes of the apparatus 2. The attribute information of the apparatus 2 may include, for example, at least one of the version information of the OS program of the apparatus 2 and information regarding the serial number of the hardware (for example, a processor or a storage device) configuring the apparatus 2. In addition, the attribute information of the apparatus 2 included in the digital certificate may be encrypted by a hash function or the like. In this case, the apparatus 2 may transmit the attribute information of the apparatus 2 to the server of the certificate authority when transmitting the public key and the digital certificate issuance request (certificate signing request). Thus, since the attribute information of the apparatus 2 is included in the digital certificate, it is authenticated that the digital certificate has been issued in response to the request from the apparatus 2. Therefore, it is preferably prevented that apparatuses other than the apparatus 2 use the public key and the digital certificate of the apparatus 2.

In addition, the digital certificate may include attribute information of a user associated with the apparatus 2 (for example, a user who owns the apparatus 2). For example, an example of the attribute information of the user is the user's name, identification number, contact information, age, gender, address, or credit card information. Thus, since the attribute information of the user is included in the digital certificate, it is preferably prevented that a third party other than the user uses the public key and the digital certificate of the apparatus 2. In addition, when the apparatus 2 transmits a digital certificate including the attribute information of the user to the WEB server, the WEB server can check the user attribute information included in the digital certificate. Therefore, the user of the apparatus 2 can use the online service (EC site or the like) provided by the WEB server without registering the user information or the like. That is, since the user of the apparatus 2 can be freed from the trouble of managing the login information (login ID and login password) of each online service, it is possible to provide the user with a rich online experience.

In addition, the hash value of the attribute information of the apparatus 2 and/or the attribute information of the user (hereinafter, may be simply referred to as "attribute information") described in the digital certificate may be included in the digital certificate. The hash value is generated based on the attribute information and the cryptographic hash function. In this case, if the attribute information described in the digital certificate is falsified by a third party, the hash value changes, so that the falsification of the attribute information can be detected based on the hash value. For example, when the apparatus 2 transmits the digital certificate to the external apparatus, the external apparatus calculates the hash value of the attribute information of the digital certificate to determine whether or not the calculated hash value matches the hash value shown in the digital certificate. Here, if the calculated hash value matches the hash value shown in the digital certificate, the external apparatus determines that the attribute information of the digital certificate has not been falsified. On the other hand, if the two do not match, the external apparatus determines that the attribute information of the digital certificate has been falsified.

In addition, the hash values of all the description contents described in the digital certificate may be included in the digital certificate. In this case as well, if some of the contents described in the digital certificate are falsified by a third party, the hash value changes, so that the falsification of the description contents of the digital certificate by the third party can be detected based on the hash value.

Figure 8:
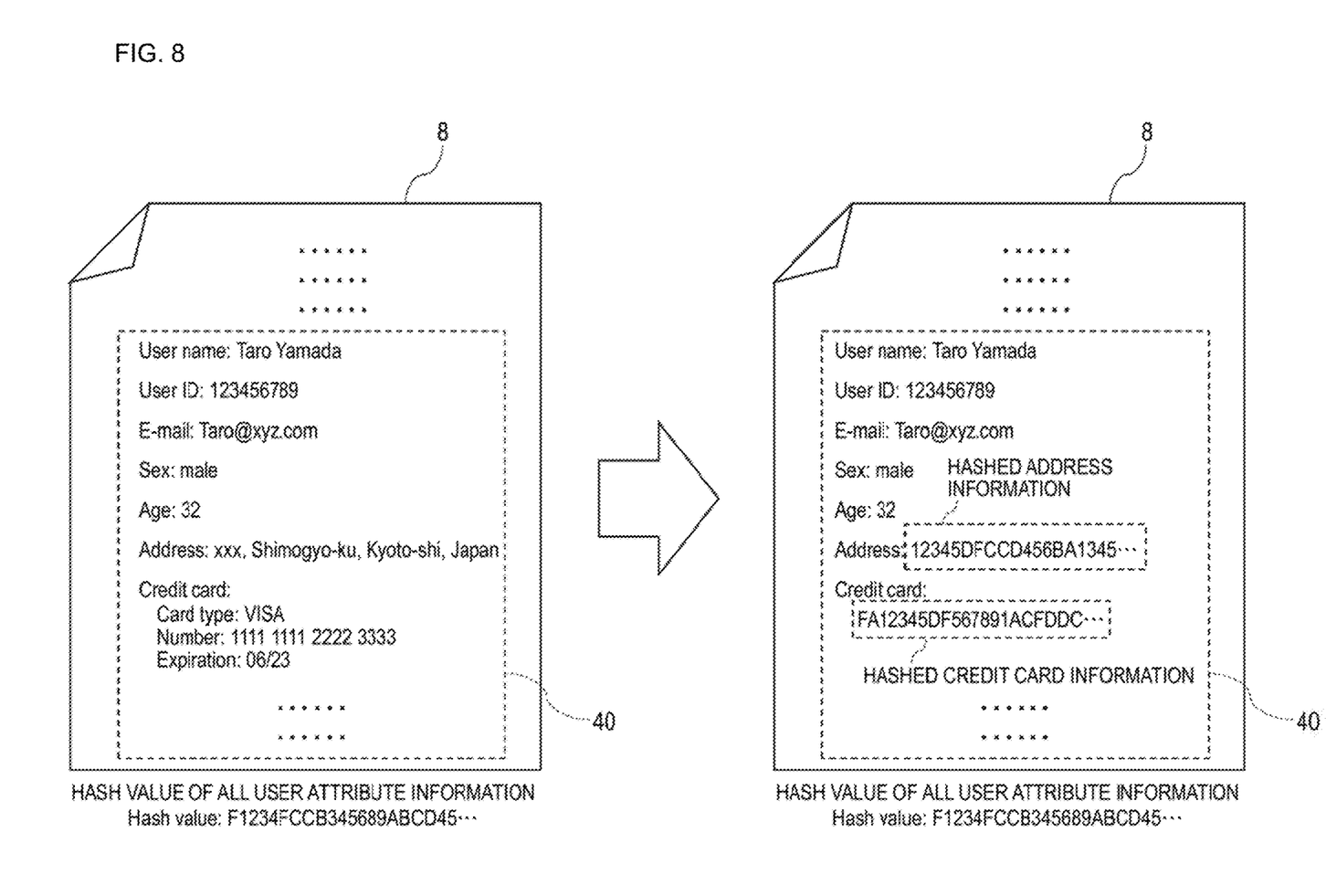
FIG. 8 is a diagram illustrating an example of a digital certificate before and after some of user attribute information are hashed.

As described above, the digital certificate includes the attribute information of the apparatus 2 and/or the attribute information of the user. In this case, all the pieces of attribute information described in the digital certificate may be transmitted to the external apparatus, or some of the attribute information described in the digital certificate may not be transmitted to the external apparatus. That is, some of the attribute information described in the digital certificate may be hashed by the hash function. For example, as illustrated in FIG. 8, the user can hash an address, credit card information, and the like in user attribute information 40 described in a digital certificate 8 through an input operation on the apparatus 2. Thus, the external apparatus that has received the digital certificate 8 from the apparatus 2 cannot specify the address and credit card information in the user attribute information 40 described in the digital certificate 8, but can specify the user attribute information 40 other than the address and credit card information.

In addition, as illustrated in FIG. 8, the hash values of all the pieces of attribute information when all the pieces of attribute information are displayed match the hash values of all the pieces of attribute information when some of the attribute information are not displayed (are hashed). Similarly, the hash values of all the description contents described in the digital certificate when all the pieces of attribute information are displayed match the hash values of all the description contents described in the digital certificate when some of the attribute information are not displayed (are hashed). That is, even if some of the attribute information are hashed, the hash values of all the pieces of attribute information or the hash values of all the description contents described in the digital certificate are not changed, so that the falsification of the digital certificate by the third party can be easily detected based on the hash value.

In addition, non-display (hashing) of some of the attribute information may be set in advance by the user, or may be changed in response to a request from the external apparatus. In addition, a situation is considered in which the original attribute information is grasped based on the hash value of the attribute information by referring to a database indicating the relationship between the hash value and the original information. In order to prevent such a situation, the original attribute information may be hashed based on a predetermined coefficient and the original attribute information. In this case, the predetermined coefficient may be a constant, or may be a variable that changes based on predetermined information (for example, date information of a digital certificate).

Figure 4:
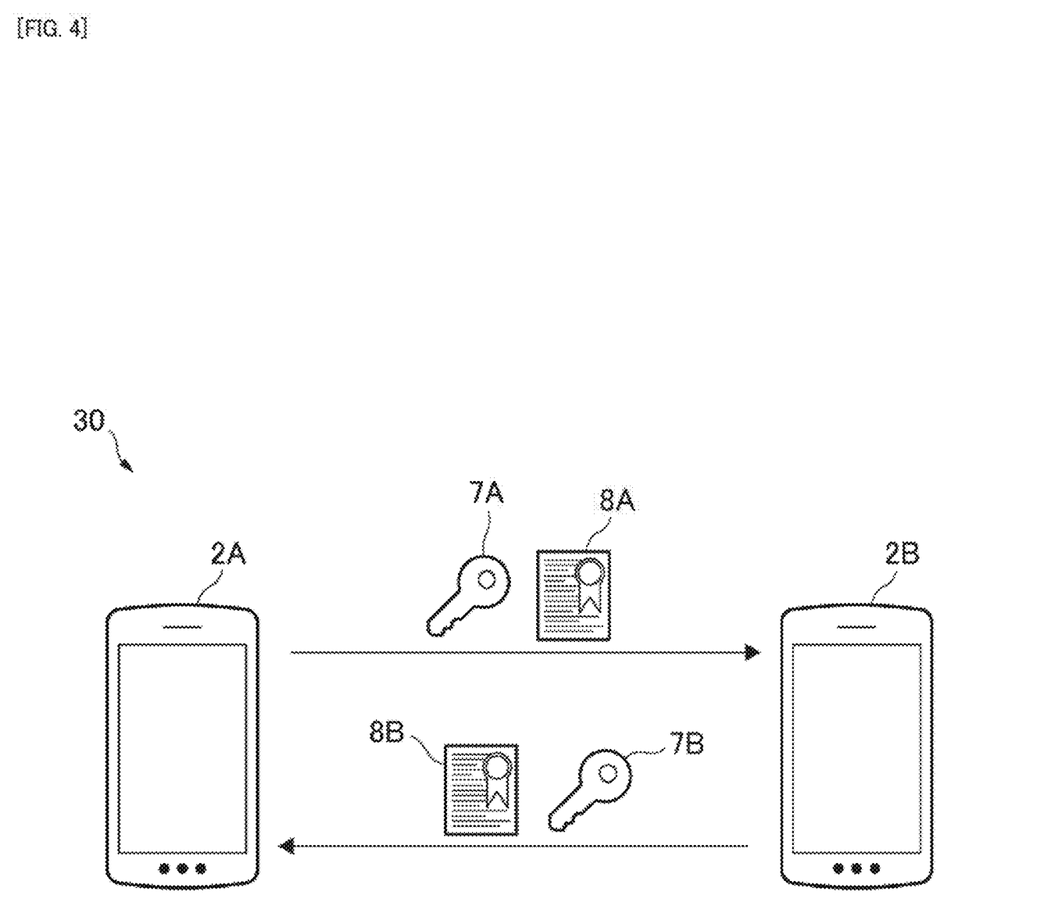
FIG. 4 is a diagram illustrating an information processing system including two information processing apparatuses.
Figure 5:
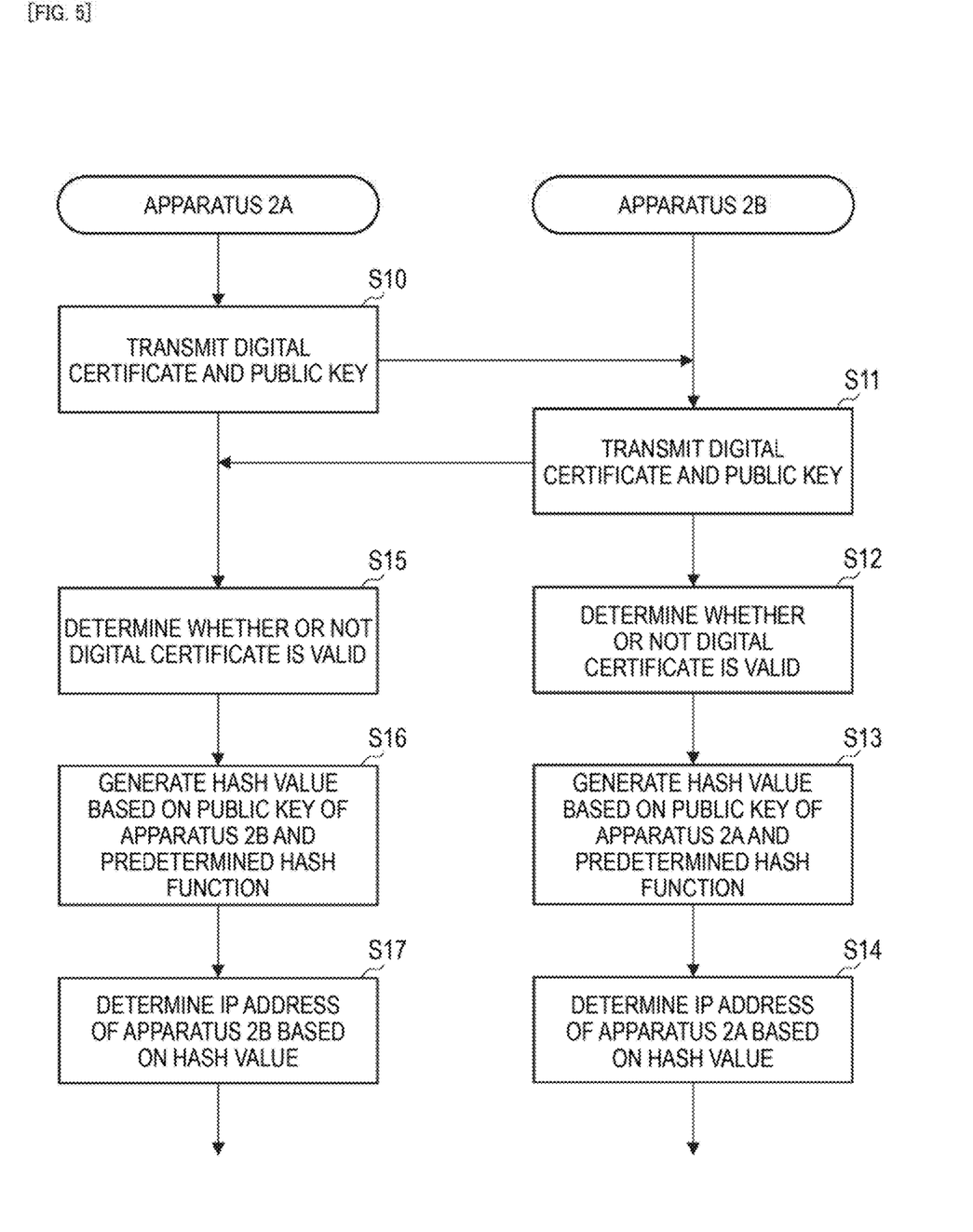
FIG. 5 is a flowchart for describing an example of a process of determining an IP address of an external apparatus.

Next, an information processing system 30 according to the present embodiment will be described below with reference mainly to FIGS. 4 and 5. FIG. 4 is a diagram illustrating the information processing system 30 including an information processing apparatus 2A (hereinafter, simply referred to as "apparatus 2A") and an information processing apparatus 2B (hereinafter, simply referred to as "apparatus 2B"). FIG. 5 is a flowchart for describing an example of a process of determining the IP address of an external apparatus.

In addition, in the information processing system 30 of the present embodiment, in order to simplify the explanation, the number of information processing apparatuses that are communicably connected to each other is set to two. However, the number of information processing apparatuses that are communicably connected to each other may be three or more. In addition, it is assumed that each of the apparatuses 2A and 2B has the hardware configuration of the apparatus 2 illustrated in FIG. 1.

In addition, it is assumed that each of the apparatuses 2A and 2B has already executed the process of determining the IP address illustrated in FIG. 2. That is, it is assumed that the apparatus 2A has already executed the process of determining the IP address of the apparatus 2A. Therefore, as illustrated in FIG. 4, it is assumed that the apparatus 2A has already generated a public key 7A associated with the IP address of the apparatus 2A and has already acquired the digital certificate 8A associated with the public key 7A from the certificate authority. Similarly, it is assumed that the apparatus 2B has already executed the process of determining the IP address of the apparatus 2B. Therefore, as illustrated in FIG. 4, it is assumed that the apparatus 2B has already generated a public key 7B associated with the IP address of the apparatus 2B and has already acquired the digital certificate 8B associated with the public key 7B from the certificate authority.

As illustrated in FIG. 5, in step S10, the apparatus 2A (specifically, the control unit 20 of the apparatus 2A) transmits (broadcasts) the public key 7A and the digital certificate 8A associated with the public key 7A to the outside of the apparatus 2A. Thereafter, the apparatus 2B present in the vicinity of the apparatus 2A receives the public key 7A and the digital certificate 8A broadcast from the apparatus 2A. In addition, in step S11, the apparatus 2B (specifically, the control unit 20 of the apparatus 2B) transmits (broadcasts) the public key 7B and the digital certificate 8B associated with the public key 7B to the outside of the apparatus 2B. Thereafter, the apparatus 2A receives the public key 7B and the digital certificate 8B broadcast from the apparatus 2B. In addition, the process of step S1*l* may be executed at the same time as the process of step S10, or may be executed before the process of step S10.

Then, in step S12, the apparatus 2B determines whether or not the digital certificate 8A broadcast from the apparatus 2A is valid. Here, the process of determining the validity of the digital certificate 8A (that is, the process of step S12) will be described below with reference to FIG. 6.

Figure 6:
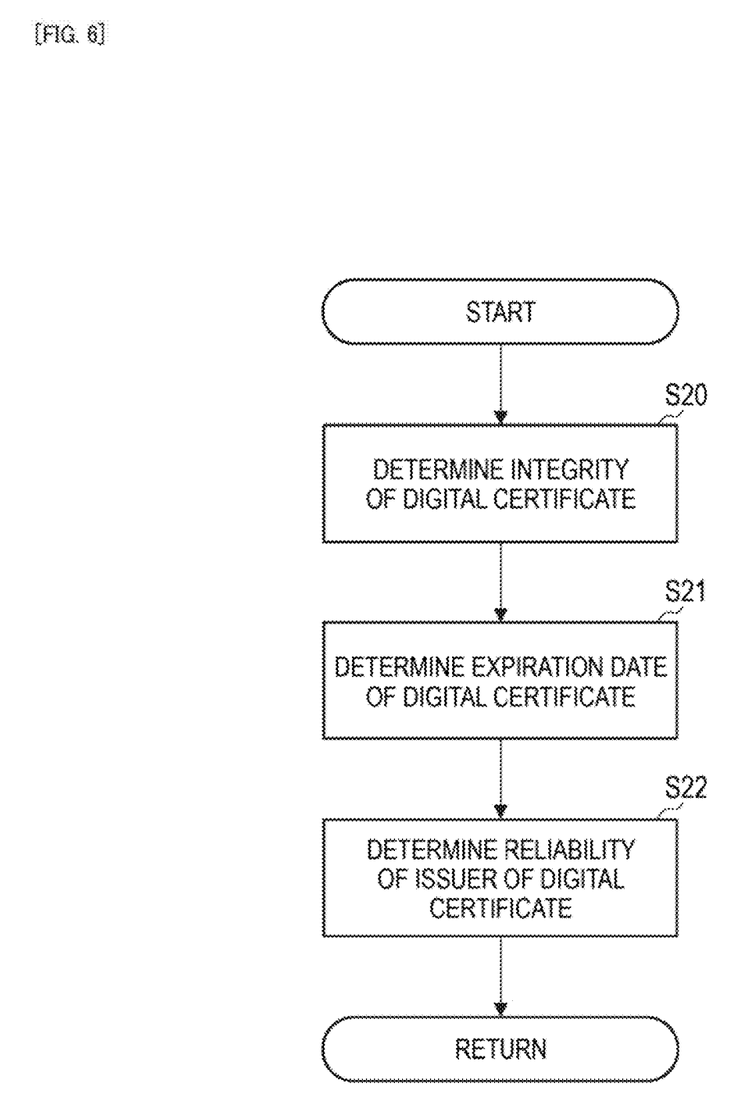
FIG. 6 is a flowchart illustrating an example of a process of determining the validity of a digital certificate transmitted from an external apparatus.

As illustrated in FIG. 6, in step S20, the apparatus 2B determines the integrity of the digital certificate 8A. Specifically, the apparatus 2B checks the owner information of the digital certificate 8A, the issuer information of the digital certificate 8A, and the digital signature of the issuer. Then, in step S21, the apparatus 2B determines the expiration date of the digital certificate 8A. Then, in step S22, the apparatus 2B determines the reliability of the issuer of the digital certificate 8A. In particular, when the certificate authority that has issued the digital certificate 8A is an intermediate certificate authority, the apparatus 2B specifies the root certificate authority of the intermediate certificate authority that has issued the digital certificate 8A, and determines whether or not the specified root certificate authority is reliable. For example, when the specified root certificate authority is included in information regarding a plurality of root certificate authorities stored in the memory of the apparatus 2B, it is determined that the issuer of the digital certificate 8A is reliable.

Returning to FIG. 5, when it is determined that the digital certificate 8A is valid, the apparatus 2B generates a hash value based on the public key 7A and a predetermined hash function (step S13). Here, the predetermined hash function is a cryptographic hash function, such as BLAKE, as described above. In addition, in the present embodiment, it is assumed that the hash function used by the apparatus 2B and the hash function used by the apparatus 2A are the same.

Then, in step S14, the apparatus 2B determines the IP address of the apparatus 2A based on the generated hash value. For example, as described above, when the size of the hash value is 256 bits and the IP address (128 bits) corresponding to IPv6 is used as the IP address of the apparatus 2A, the apparatus 2B may determine the hash value of the first 32 digits of the 64-digit hash value as the IP address of the apparatus 2A.

On the other hand, in step S15, the apparatus 2A determines whether or not the digital certificate 8B broadcast from the apparatus 2B is valid. The specific content of the process in step S15 is as illustrated in FIG. 6. Then, when it is determined that the digital certificate 8B is valid, the apparatus 2A generates a hash value based on the public key 7B and a predetermined hash function (step S16). In addition, as already described, the hash function used by the apparatus 2A is the same as the hash function used by the apparatus 2B.

Thereafter, in step S17, the apparatus 2A determines the IP address of the apparatus 2B based on the generated hash value. Similar to the process of step S14, when the size of the hash value is 256 bits and the IP address (128 bits) corresponding to IPv6 is used as the IP address of the apparatus 2B, the apparatus 2A may determine the hash value of the first 32 digits of the 64-digit hash value as the IP address of the apparatus 2B.

In this manner, the apparatus 2A can know the IP addresses of the apparatuses 2A and 2B, and the apparatus 2B can know the IP addresses of the apparatuses 2A and 2B. Therefore, the apparatuses 2A and 2B can be directly connected to each other without going through a server that manages the IP address (that is, P2P communication between the apparatuses 2A and 2B without going through a server can be realized). In particular, since it is not necessary to relay a virtual private network (VPN) server to connect the apparatuses 2A and 2B to each other, the power consumption required for the direct connection between the apparatuses 2A and 2B can be significantly reduced. In addition, since it is not necessary to relay the VPN server when directly connecting three or more apparatuses to each other, the power consumption required for the direct connection between the three or more apparatuses can be significantly reduced.

For example, since the apparatus 2A can transmit a message to the apparatus 2B without going through an email server or the like, it is possible to avoid a situation in which the message of the apparatus 2A is grasped by a third party (for example, a server administrator or the like). In addition, the apparatus 2A can transmit image data showing the screen of the apparatus 2A to the apparatus 2B without going through the VPN server. On the other hand, the apparatus 2B can transmit an operation signal for operating the screen of the apparatus 2A to the apparatus 2A without going through the VPN server. In this manner, the user of the apparatus 2B can remotely operate the apparatus 2A. In addition, the apparatus 2A and the apparatus 2B can share electronic files with each other without going through a file exchange server. Therefore, it is possible to avoid a situation in which the shared electronic file is grasped by a third party.

In addition, when the apparatus 2A transmits a message to the apparatus 2B (or when the apparatus 2B transmits a message to the apparatus 2A), the transmitted message (transmission packet) may be encrypted. For example, the transmitted message may be encrypted by a common key generated based on the public key 7A of the apparatus 2A and the public key 7B of the apparatus 2B. In addition, the common key may be changed each time a session between the apparatus 2A and the apparatus 2B is established. In this manner, it is possible to realize secure communication between the apparatus 2A and the apparatus 2B.

In addition, according to the present embodiment, when the digital certificate transmitted from the external apparatus is determined to be valid, the hash value of the external apparatus is generated based on the public key of the external apparatus. Thereafter, the IP address of the external apparatus is determined based on the hash value of the external apparatus (here, the apparatus 2B is the external apparatus when viewed from the apparatus 2A, while the apparatus 2A is the external apparatus when viewed from the apparatus 2B). In this manner, the apparatus 2A can check that the received public key 7B is the public key of the apparatus 2B. In addition, the apparatus 2A can check that the IP address generated based on the public key 7B is the IP address of the apparatus 2B. Therefore, the apparatus 2A can reliably acquire the IP address of the apparatus 2B and can reliably communicate with the apparatus 2B by using the IP address of the apparatus 2B.

On the other hand, the apparatus 2B can check that the received public key 7A is the public key of the apparatus 2A. In addition, the apparatus 2B can check that the IP address generated based on the public key 7A is the IP address of the apparatus 2A. Therefore, the apparatus 2B can reliably acquire the IP address of the apparatus 2A and can reliably communicate with the apparatus 2A by using the IP address of the apparatus 2A.

Figure 7:
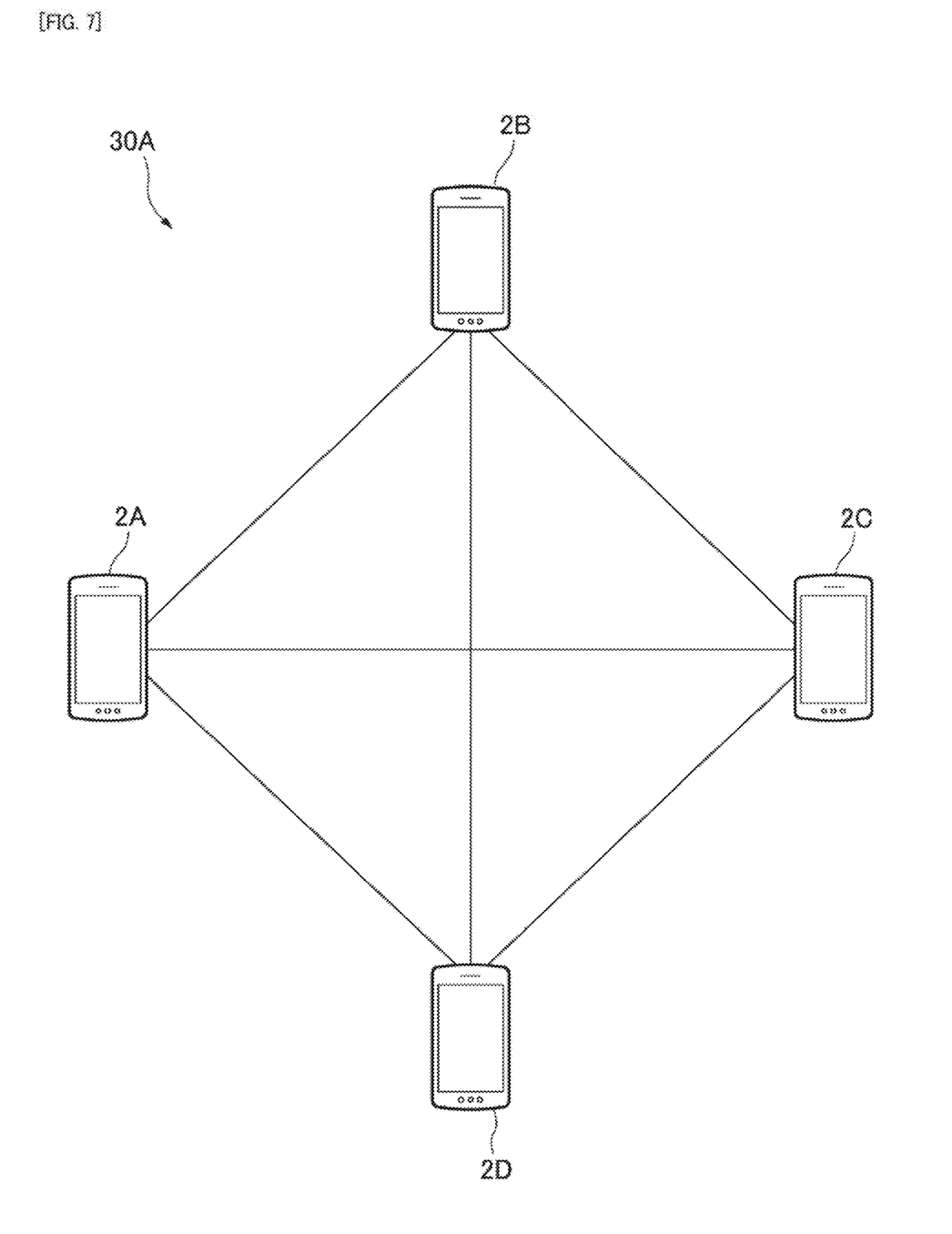
FIG. 7 is a diagram illustrating an information processing system including four information processing apparatuses.

In addition, as described above, the information processing system according to the present embodiment may have three or more information processing apparatuses. For example, as illustrated in FIG. 7, a case is considered in which the information processing system 30A has four information processing apparatuses 2A to 2D (hereinafter, simply referred to as "apparatuses 2A to 2D"). Here, it is assumed that each of the apparatuses 2A to 2D has the hardware configuration of the apparatus 2 illustrated in FIG. 1. In this case, each of the apparatuses 2A to 2D executes each process executed by the apparatus 2A or the apparatus 2B illustrated in FIG. 5.

In this regard, the apparatus 2A broadcasts the public key and the digital certificate of the apparatus 2A to the outside, and receives the public key and the digital certificate from each of the apparatuses 2B to 2D present in the vicinity of the apparatus 2A. The apparatus 2B broadcasts the public key and the digital certificate of the apparatus 2B to the outside, and receives the public key and the digital certificate from each of the apparatuses 2A, 2C, and 2D. The apparatus 2C broadcasts the public key and the digital certificate of the apparatus 2C to the outside, and receives the public key and the digital certificate from each of the apparatus 2A, 2B, and 2D. The apparatus 2D broadcasts the public key and the digital certificate of the apparatus 2D to the outside, and receives the public key and the digital certificate from each of the apparatuses 2A to 2C.

Thereafter, the apparatus 2A determines the IP addresses of the apparatuses 2B to 2D. The apparatus 2B determines the IP addresses of the apparatuses 2A, 2C, and 2D. The apparatus 2C determines the IP addresses of the apparatuses 2A, 2B, and 2D. The apparatus 2D determines the IP addresses of the apparatuses 2A to 2C. In this manner, each of the apparatuses 2A to 2D can be directly connected to the three external apparatuses using the IP addresses of the apparatuses 2A to 2D. In other words, the apparatuses 2A to 2D may form a mesh network. In addition, the apparatuses 2A to 2D may be connected to each other through predetermined routing in the communication network. The apparatuses 2A to 2D can be connected to each other by forming an optimal path.

In addition, in the information processing system 30A illustrated in FIG. 7, since each of the apparatuses 2A to 2D uses the same hash function, a mesh network is configured by the apparatuses 2A to 2D, but the present embodiment is limited thereto.

For example, the apparatuses 2A and 2B may use a first hash function, while the apparatuses 2C and 2D may use a second hash function different from the first hash function. In this case, the apparatuses 2A and 2B are communicably connected to each other, and the apparatuses 2C and 2D are communicably connected to each other. On the other hand, the apparatuses 2A and 2B are not communicably connected to the apparatuses 2C and 2D. In this manner, two communication network groups can be constructed in the information processing system 30A by using two different hash functions.

In addition, in order to realize the apparatus 2 according to the present embodiment by software, an information processing program may be stored in advance in the storage device 23 or the ROM. Alternatively, the information processing program may be stored in a computer-readable storage medium, such as a magnetic disk (for example, an HDD or a floppy disk), an optical disk (for example, a CD-ROM, a DVD-ROM, or a Blu-ray (registered trademark) disk), a magneto-optical disk (for example, an MO), or a flash memory (for example, an SD card, a USB memory, or an SSD). In this case, the information processing program stored in the computer-readable storage medium may be stored in the storage device 23. In addition, the information processing program stored in the storage device 23 may be loaded onto the RAM, and then the processor may execute the information processing program loaded onto the RAM. In this manner, the information processing method according to the present embodiment is executed by the apparatus 2.

In addition, the information processing program may be stored in a storage medium (for example, an HDD) of a server on a communication network, such as the Internet. In this case, the information processing program may be downloaded from the server through the network interface 25. In this case as well, the downloaded information processing program may be stored in the storage device 23.

In addition, the information processing program (information processing method) according to the present embodiment is executed by the network layer in the OSI (Open Systems Interconnection) reference model. Therefore, secure communication can be realized in the transport layer, session layer, presentation layer, and application layer of the OSI reference model, and the existing application program and physical infrastructure can be applied as they are.

While the embodiment of the invention has been described above, the technical scope of the invention should not be construed as being limited by the description of the present embodiment. The present embodiment is an example, and it is understood by those skilled in the art that various embodiments can be changed within the scope of the invention described in the claims. The technical scope of the invention should be determined based on the scope of the invention described in the claims and the equivalent scope thereof.

For example, in the process of step S7 illustrated in FIG. 2, the apparatus 2 may acquire the digital certificate associated with the public key of the apparatus 2 from the certificate authorities of a plurality of organizations. In addition, the digital certificate may include information regarding the attributes of the organization of the certificate authority. For example, when the digital certificate is issued by the certificate authority of an organization X, the digital certificate may include information regarding the attributes of the organization X.

In addition, as illustrated in FIG. 4, the apparatus 2A acquires a plurality of digital certificates 8A from the certificate authorities of a plurality of different organizations, and the apparatus 2B acquires a plurality of digital certificates 8B from the certificate authorities of a plurality of different organizations. In this case, the apparatus 2A transmits the public key 7A and the plurality of digital certificates 8A to the apparatus 2B in step S10. In addition, in step S11, the apparatus 2B transmits the public key 7B and the plurality of digital certificates 8B to the apparatus 2A. In addition, the apparatus 2B may determine whether or not at least one of the organizations of the plurality of certificate authorities that have issued the plurality of digital certificates 8A is included in the organization list indicating the organizations of the plurality of certificate authorities stored in the memory of the apparatus 2B after determining whether or not each of the plurality of digital certificates 8A is valid in step S12. Specifically, the apparatus 2B may determine whether or not at least one of the organizations of the plurality of certificate authorities that have issued the plurality of digital certificates 8A is included in the organization list based on the organization list and the information regarding the attributes of the organization included in the digital certificate 8A. The apparatus 2B may execute the processes of steps S13 and S14 when at least one of the organizations of the plurality of certificate authorities that have issued the plurality of digital certificates 8A is included in the organization list.

Similarly, the apparatus 2A may determine whether or not at least one of the organizations of the plurality of certificate authorities that issued the plurality of digital certificates 8B is included in the organization list indicating the plurality of organizations stored in the memory of the apparatus 2A after determining whether or not each of the plurality of digital certificates 8B is valid in step S15. Specifically, the apparatus 2A may determine whether or not at least one of the organizations of the plurality of certificate authorities that have issued the plurality of digital certificates 8B is included in the organization list based on the organization list and the information regarding the attributes of the organization included in the digital certificate 8B. The apparatus 2A may execute the processes of steps S16 and S17 when at least one of the plurality of organizations that have issued the plurality of digital certificates 8B is included in the organization list.

In this manner, when the organization that has issued the digital certificate of the public key 7A is included in the organization list stored in the apparatus 2B and the organization that has issued the digital certificate of the public key 7B is included in the organization list stored in the apparatus 2A, the apparatus 2A and the apparatus 2B may be directly connected to each other. That is, it is possible to select a communication partner according to the conditions associated with the organization that has issued the digital certificate, and it is possible to construct a plurality of communication network groups in the information processing system.

In addition, in the example described above, the apparatuses 2A and 2B acquire a plurality of digital certificates. However, even when the apparatuses 2A and 2B acquire one digital certificate, processing related to the determination condition associated with the organization that has issued the digital certificate may be applied. For example, when the organization of the certificate authority that has issued the digital certificate of the apparatus 2A and the organization of the certificate authority that has issued the digital certificate of the apparatus 2B are different, the processes of steps S13 and S14 (processes of steps S16 and S17) may not be executed.

In addition, in the present embodiment, an IP address, which is a network address corresponding to the Internet protocol, has been described as an example of the network addresses of the apparatuses 2A and 2B. However, the network address is not limited to the IP address. For example, the network addresses of the apparatuses 2A and 2B may be network addresses corresponding to a predetermined communication protocol other than the Internet protocol.

This application appropriately incorporates the contents disclosed in the Japanese patent application (Japanese Patent Application No. 2018-166429) filed on Sep. 5, 2018.

The invention claimed is:

1. A method of self-addressing apparatuses for network communication, the method executed by a processor of an apparatus, the method comprising:
generating a public key of the apparatus based on a private key of the apparatus;
generating a hash value based on the public key and a predetermined hash function;
determining a network address of the apparatus based on the hash value;
communicably connecting the apparatus to a communication network using the network address;
transmitting the public key to an external apparatus communicably connected to the apparatus;
receiving an external public key transmitted from the external apparatus, the external public key being generated by the external apparatus, the external apparatus being communicably connected to the communication network using an external network address, the external network address being generated by the external apparatus based on an external hash value, the external hash value being generated by the external apparatus based on the external public key and the predetermined hash function;

generating the external hash value by the apparatus based on the external public key and the predetermined hash function;

determining the external network address by the apparatus based on the external hash value;

receiving communication from the external apparatus through the communication network at the network address, the external apparatus determining the network address of the apparatus based on the hash value, the external apparatus determining the hash value of the apparatus based on the public key and the predetermined hash function; and sending communication through the communication network to the external apparatus at the external network address.

2. The method according to claim 1, further comprising:
generating the private key.

3. The method according to claim 1, further comprising:
determining whether or not the hash value satisfies a predetermined condition,
wherein the network address is determined based on the hash value responsive to a determination that the hash value satisfies the predetermined condition.

4. The method according to claim 3, further comprising:
generating the private key,
wherein, responsive to a determination that the hash value does not satisfy the predetermined condition, the generating of the private key, the generating of the public key, and the generating of the hash value are repeatedly performed until the hash value satisfies the predetermined condition.

5. The method according to claim 3,
wherein the predetermined condition includes a condition associated with values of at least one preselected digit of the hash value.

6. The method according to claim 3,
wherein the predetermined condition includes a condition associated with a type of the apparatus.

7. The method according to claim 1,
wherein the hash value is generated based on the public key, a value associated with a predetermined organization, and the predetermined hash function.

8. The method according to claim 7,
wherein the value associated with the predetermined organization is a value associated with a trademark of the predetermined organization.

9. The method according to claim 1, further comprising:
acquiring a digital certificate associated with the public key from a certificate authority.

10. The method according to claim 9, further comprising:
transmitting the public key and the digital certificate to the external apparatus.

11. The method according to claim 9,
wherein the digital certificate includes attribute information related to an attribute of the apparatus.

12. The method according to claim 9,
wherein the digital certificate includes attribute information of a user associated with the apparatus.

13. The method according to claim 9,
wherein, for a plurality of pieces of attribute information of one of the apparatus and a user associated with the apparatus, the digital certificate describes each of the plurality of pieces of attribute information, and includes a hash value of all of the plurality of pieces of attribute information.

14. The method according to claim 13,
wherein the digital certificate describes at least a first piece of the plurality of pieces of attribute information by including a hash value of the first piece, and describes at least a second piece of the plurality of pieces of attribute information by including the second piece.

15. The method according to claim 14,
wherein the hash value of the first piece is generated based on the first piece and a predetermined coefficient.

16. The method according to claim 1,
further comprising receiving a digital certificate associated with the external public key; and
determining whether or not the digital certificate is valid,
wherein the external hash value is generated responsive to a determination that the digital certificate is valid.

17. A system for self-addressed network communication, the system comprising:
a first apparatus comprising a first processor; and
a second apparatus communicably connected to the first apparatus and comprising a second processor,
wherein the first apparatus generates a first public key of the first apparatus based on a first private key of the first apparatus, generates a first hash value based on the first public key and a predetermined hash function, determines a first network address of the first apparatus based on the first hash value, and provides the first public key to the second apparatus,
wherein the second apparatus generates a second public key of the second apparatus based on a second private key of the second apparatus, generates a second hash value based on the second public key and the predetermined hash function, determines a second network address of the second apparatus based on the second hash value, and provides the second public key to the first apparatus,
wherein the first apparatus receives the second public key from the second apparatus, generates the second hash value based on the second public key and the predetermined hash function, and determines the second network address based on the second hash value, the first apparatus being thereby enabled to communicate to the second apparatus at the second network address through a communication network, and
wherein the second apparatus receives the first public key from the first apparatus, generates the first hash value based on the first public key and the predetermined hash function, and determines the first network address based on the first hash value, the second apparatus being thereby enabled to communicate to the first apparatus at the first network address through the communication network.

18. The system according to claim 17,
wherein the first apparatus transmits the first public key to a certificate authority, acquires a first digital certificate associated with the first public key from the certificate authority, and transmits the first digital certificate and the first public key to the second apparatus,
wherein the second apparatus transmits the second public key to the certificate authority or another certificate authority, acquires a second digital certificate associated with the second public key from the certificate authority or the another certificate authority, and transmits the second digital certificate and the second public key to the first apparatus, wherein the first apparatus receives the second public key and the second digital certificate from the second apparatus, and determines whether or not the second digital certificate is valid, and wherein the second apparatus receives the first public key and the first digital certificate from the first apparatus, and determines whether or not the first digital certificate is valid.

* * * * *